United States Patent
Rubini et al.

(10) Patent No.: US 12,145,683 B2
(45) Date of Patent: Nov. 19, 2024

(54) RADIO-TRANSMISSION BICYCLE CONTROL DEVICE

(71) Applicant: CAMPAGNOLO S.R.L., Vicenza (IT)

(72) Inventors: Stefano Rubini, Monticello Conte Otto (IT); Marco Porro, Abano Terme (IT)

(73) Assignee: CAMPAGNOLO S.R.L., Vicenza (IT)

( * ) Notice: Subject to any disclaimer, the term of this patent is extended or adjusted under 35 U.S.C. 154(b) by 129 days.

(21) Appl. No.: 18/182,572

(22) Filed: Mar. 13, 2023

(65) Prior Publication Data

US 2023/0294794 A1    Sep. 21, 2023

(30) Foreign Application Priority Data

Mar. 15, 2022 (IT) .................. 102022000005039

(51) Int. Cl.
 *B62K 23/02* (2006.01)
 *B62M 25/08* (2006.01)
(52) U.S. Cl.
 CPC ............. *B62K 23/02* (2013.01); *B62M 25/08* (2013.01)
(58) Field of Classification Search
 CPC ........ B62K 23/00; B62K 23/02; B62K 23/06; B62K 21/12; B62M 9/122
 See application file for complete search history.

(56) References Cited

U.S. PATENT DOCUMENTS

| | | | | |
|---|---|---|---|---|
| 2020/0354010 A1* | 11/2020 | Hsieh | ............... | B62K 21/12 |
| 2023/0261186 A1* | 8/2023 | Cai | ............... | H01M 4/131 |
| | | | | 429/221 |
| 2024/0123839 A1* | 4/2024 | Carlier | ............... | B60L 50/66 |
| 2024/0246635 A1* | 7/2024 | Hahn | ............... | B62M 9/133 |

FOREIGN PATENT DOCUMENTS

| | | |
|---|---|---|
| EP | 2135804 B1 | 7/2012 |
| EP | 2719616 B1 | 6/2016 |
| EP | 3147194 A1 | 3/2017 |
| EP | 2703275 B1 | 5/2020 |
| EP | 3683130 B1 | 3/2022 |

OTHER PUBLICATIONS

Italian Search Report for Italian application No. 02022000005039 filed on Mar. 15, 2022 on behalf of Campagnolo S.R.L.Mail Date: Oct. 28, 2022. 2 pages.
Specialchem Sa: "Volume Resistivity: Electrical Resistivity of Plastic", Omnexus—The Material Search Platform Plastics & Elastomers. Feb. 15, 2021. https://web.archive.org/web/20210215200925/ https://omnexus.specialchem.com/polymer-properties/properties/volume-resistivity. pp. 1-8. Retrieved online on Oct. 27, 2022. 8 pages.

* cited by examiner

*Primary Examiner* — Van T Trieu

(74) *Attorney, Agent, or Firm* — Steinfl + Bruno LLP

(57) ABSTRACT

A bicycle control device includes a body, at least one button on the body, an antenna for connection via radio to a component of the bicycle, and an electronic unit mounted in the body and connected to the button and to the antenna. The control device also includes an insert made of electrically insulating material, with a resistivity greater than $10^7$ $\Omega$m, on the body, the antenna being on the insert. The arrangement of the antenna on the insert of such an insulating material reduces or eliminates disturbances during the transmission from the antenna to the component, independently of the material of the body.

13 Claims, 3 Drawing Sheets

RADIO-TRANSMISSION BICYCLE CONTROL DEVICE

CROSS REFERENCE TO RELATED APPLICATIONS

The present application claims priority to Italian patent application No. 102022000005039 filed on Mar. 15, 2022, the contents of which are incorporated herein by reference in their entirety.

FIELD

The present disclosure refers to a radio-transmission bicycle control device.

BACKGROUND

Hereinafter, the term "component" is meant to indicate a sub-system of the bicycle the configuration of which can be changed by the cyclist while riding to change the riding conditions. The term "component" as used here thus includes gearshifts, both rear gearshifts and front gearshifts (also called derailleurs), brakes, seat posts, shock absorbers, assisted pedaling motors, lights and yet more.

The expression "control device" is meant to indicate a member able to be actuated by the cyclist to intervene on the configuration of a component. The expression "control device" as used here thus includes gearshift control devices, brake control devices and integrated control devices, which allow intervention both on the gearshift and on the brake. The control devices are normally mounted on the handlebar of the bicycle so as to be able to be actuated by the hands of the cyclist. In the jargon of the field, control devices are often simply called controls.

The spread of electrically actuated components, i.e. in which the movements are imparted not by the mechanical effort of the cyclist through cables and/or relays but rather by the actuation by suitably controlled electric motors, has made it possible to obtain ever greater precision and speed. In particular, with electrically actuated gearshifts it has been possible to obtain improvements in precision and speed of actuation, which are of great importance for the best operation of the bicycle.

The electrically actuated components are connected to the respective control device. While electrical connections via cable were initially used, systems have recently become popular in which the control device sends signals via radio to the component, using known wireless transmission technologies, such as Wi-Fi, Bluetooth® and similar. This way of sending signals avoids the need to provide cables between the control device and the component, thus allowing a simpler and cleaner architecture of the bicycle, as well as easier mounting thereof. Moreover, with modern radio transmission systems it is also possible to achieve a reduction in the total weight of the bicycle.

SUMMARY

It has been found that sometimes the radio transmission of signals is affected by disturbances that can alter the operation, so that instructions not corresponding to what was entered by the cyclist on the control device reach the component.

In particular, it has been noted by the inventors that these transmission problems occur when the control device is made of carbon-fiber-based composite material.

According to several embodiments of the disclosure, a bicycle control device comprises a body, at least a button mounted on the body, an antenna for connection via radio to a component of the bicycle, and an electronic unit mounted on the body and connected to the button and to the antenna, and is characterized in that it comprises an insert of material having resistivity greater than $10^7$ Ωm mounted on the body, wherein the antenna is mounted on the insert.

It has been found that the arrangement of the transmission antenna on the insert of such a material, i.e. an electrically insulating material, eliminates (or at least considerably reduces) the transmission disturbances from the antenna to the component, whatever material the body of the control device is made of.

The antenna is mounted on the insert through gluing, or it is incorporated in the material itself of the insert at the moment when it is formed.

Preferably, the body comprises a seat in which the insert is housed, wherein the shape and size of the seat and of the insert are such that the antenna in the insert is at least 5 mm away from the material of the body. This minimum distance ensures an extremely low probability of transmission disturbances occurring, whatever material the body of the control device is made of.

Preferably, the body comprises a cavity in which the electronic unit is housed and the seat is formed at the cavity. The presence of the cavity, as well as providing an advantageous housing for the electronic unit, makes it easier to respect the aforementioned minimum distance between the antenna and the material of the body.

Preferably, the seat is formed on an inner side of the body of the control device, which faces towards the middle of the bicycle when the control device is mounted on the bicycle. This arrangement corresponds to an area that normally is not engaged by the gripping of the hands of the cyclist; the hand of the cyclist—per se electrically conductive—is thus prevented from being able to disturb the transmission from the control device due to the contact or the excessive proximity to the antenna.

Preferably, the seat is formed in the body of the control device close to a face of the body intended for resting against the handlebar. This arrangement prevents the possibility of the hands of the cyclist being able to be rested right at the antenna in the insert, thus ruling out a possible source of disturbance in the transmission from the antenna.

Preferably, the bicycle control device comprises a support-cover, fitted onto the body and onto the insert, wherein the support-cover is made of material having resistivity greater than $10^7$ Ωm, i.e. an electrically insulating material, for example a material such as silicone rubber or similar. The support-cover promotes comfortable and secure gripping by the hands of the cyclist and also increases the separation of the antenna from possible electrically conductive materials.

Preferably, the support-cover comprises a protuberance formed inside it, engaged in a hole formed in the insert. This engagement ensures that the support-cover is and remains positioned correctly on the body of the control device.

In an embodiment, the support-cover comprises projections at the insert. The projections make it difficult the possible gripping of the hands of the cyclist at the antenna, thus avoiding the excessive proximity of the hands to the antenna.

Although the embodiments of the present disclosure can be used with any control device, it is particularly advantageous when the body of the control device is made of electrically non-insulating material, i.e. has resistivity lower than $10^7$ Ωm, such as composite material with carbon, aluminum or other metal fibers. In this case, indeed, the advantages of several embodiments of the present disclosure are particularly substantial, as the antenna can be kept away from the electrically non-insulating material, which is a source of frequent disturbances to radio transmission.

Preferably, the insert is made of polymeric material, for example and preferably a polyamide such as PA6 or PA12.

Although the embodiments of the present disclosure can be used with any control device, it is particularly advantageous when the control device is a gearshift control device. In this case, indeed, possible transmission disturbances are particularly troublesome, because they can cause a gearshifting different from that entered by the cyclist, who thus is forced to suddenly deal with unexpected travel conditions.

The control device can also be an integrated control device; in this case, a brake lever is mounted on the body. An integrated control device is indeed particularly suitable, since it is typically intended for particularly demanding cyclists, who cannot tolerate possible incorrect operation of the components.

BRIEF DESCRIPTION OF THE DRAWINGS

Further features and advantages of the embodiments of the present disclosure will be more evident from the following description of a preferred embodiment thereof, made with reference to the appended drawings.

In such drawings.

DETAILED DESCRIPTION

Figure 1:
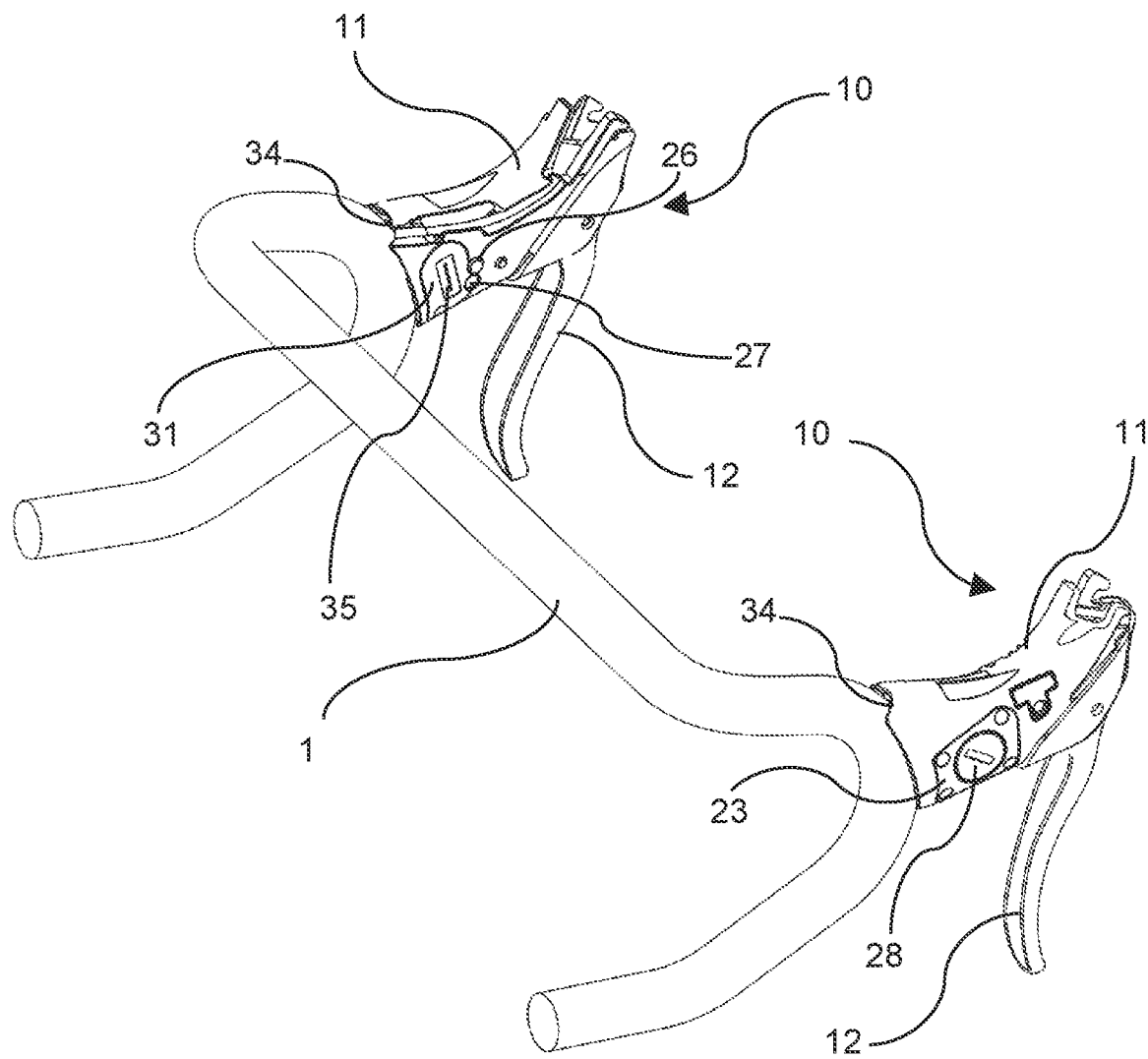
FIG. 1 is a perspective view of a bicycle handlebar on which two control devices according to the present disclosure are mounted, devoid of the support-cover to best show the characteristics of the present disclosure.
Figure 2:
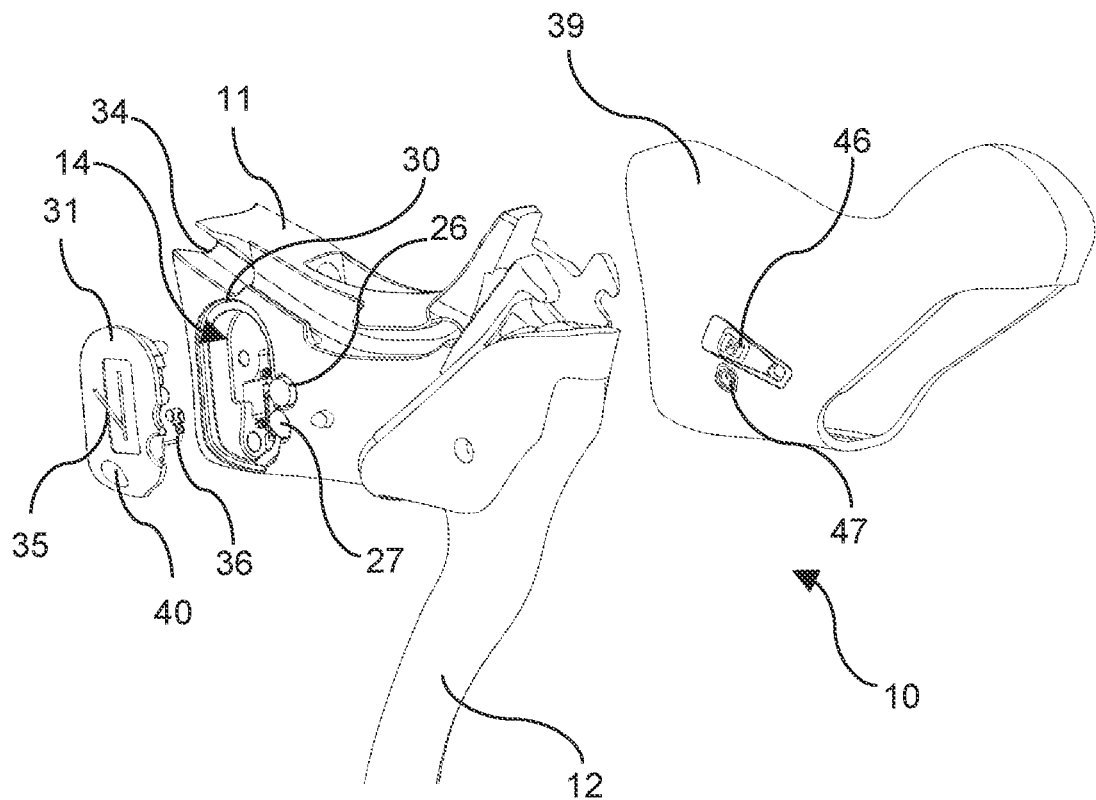
FIG. 2 is a partially exploded view of the left control device of FIG. 1, seen from the right side of the bicycle.

In the figures, reference numeral 1 indicates a bicycle handlebar on which two radio-transmission control devices 10 are mounted. The two control devices 10 mirror one another symmetrically with respect to the middle of the handlebar 1 (and therefore of the bicycle); in FIGS. 2 and 4, as stated, the left control device 10 is shown from the two sides, but the characteristics thereof are present mirrored in the right control device 10. In FIG. 1, corresponding parts of the two control devices 10 are marked by the same reference numerals. Hereinafter, the side of the control 10 facing towards the other control 10, i.e. towards the middle of the handlebar and of the bicycle, will also be called inner side, whereas the opposite side will also be called outer side.

The control device 10 comprises a body 11, removably mounted and fixed on the handlebar 1 with per se conventional means (not illustrated in the drawings). The body 11 is made with an electrically non-insulating material, i.e. with a material having electrical resistivity lower than $10^7$ Ωm. For example and preferably, such a material is a carbon-fiber-based composite material, in which the carbon fibers are incorporated in a matrix of polymeric material; alternatively, such a material could be aluminum (or an aluminum-based alloy) or even steel.

The control device 10 is an integrated control device, to control both a gearshift and a brake (not shown in the drawings); a brake lever 12 is thus mounted on the body 11.

Figure 4:
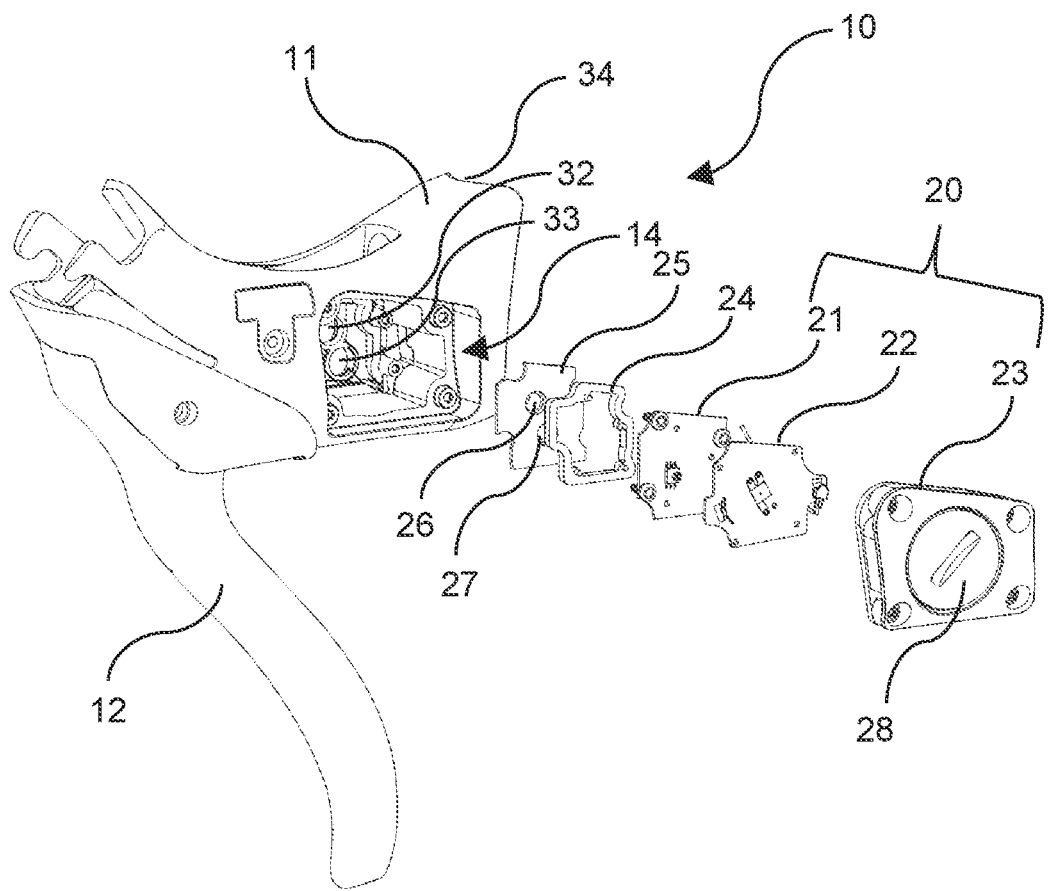
FIG. 4 is a partially exploded view of the left control device of FIG. 1, seen from the left side of the bicycle.

Inside the body 11, a cavity 14 is formed, which passes through the body 11 from the inner side (shown in FIG. 2) to the outer side (shown in FIG. 4).

An electronic unit 20 of the control device 10 is housed in the cavity 14. The electronic unit 20 is of the per se conventional type and comprises—for example—two electronic boards 21 and 22 and a battery housing 23, mounted side-by-side and electrically connected to one another; a small frame 24 for compression of a covering gasket 25 that is deformable towards the inner side of the control device 10 is also provided. Two buttons 26 and 27 are formed on the gasket 25, said buttons making it possible to activate two respective electronic buttons provided on the electronic board 21 by pressing; the two electronic buttons, per se conventional, cannot be seen in the drawings. Through the buttons 26 and 27, a component of the bicycle, like for example an electrically actuated gearshift, a brake or other, is controlled.

The following are thus mounted in order, from the inner side to the outer side of the control device 10, in the cavity 14: the gasket 25, the small frame 24, the electronic board 21, the electronic board 22, the battery housing 23. On the outer side, the battery housing 23 hermetically seals the cavity 14, being fixed with screws along its entire perimeter to the body 11. The battery (not visible in the drawings) is accessible through a cover 28, removable and hermetic, of the battery housing 23. The mutual connections between the two electronic boards 21 and 22 and between these and the battery in the battery housing 23 take place by direct contact or through connectors, not highlighted in the figures since they are per se conventional.

On the inner side of the control device 10, at the cavity 14, a seat 30 is formed, arranged peripherally around the edge of the cavity 14; an insert 31 is housed on the seat 30, sealably fixed (for example glued) on the seat 30 itself. Between the insert 31 and the body 11, there are two free holes 32 and 33, through which the two buttons 26 and 27 project from the inner side of the control device 10.

The cavity 14 is formed in the body 11 close to a face 34 of the body 11 intended for resting against the handlebar 1.

The insert 31 is made with an electrically insulating material, i.e. with resistivity greater than $10^7$ Ωm. Such a material can for example be a polymeric material, such as a polyamide PA6 or PA12.

An antenna 35 is mounted in the insert 31, embedded in the material of the insert 31 or glued to it. A connector 36, for connection with the electronic board 21, is connected to the antenna 35. The antenna 35, controlled by the electronic boards 21 and 22, emits signals towards the components to be controlled in a per se conventional manner, based on the controls entered by the cyclist by means of the buttons 26 and 27. The antenna 35 is arranged on the insert 31 in a position such that the distance thereof from the material of the body 11 is at least 5 mm.

Figure 3:
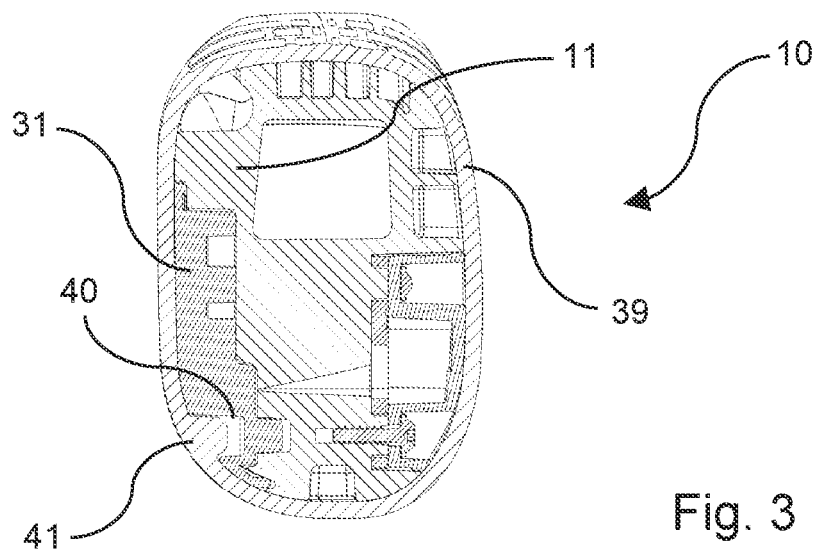
FIG. 3 is a vertical cross section view of the left control device of FIG. 1, at the insert.

The control device 10 also comprises a support-cover 39 (removed in FIG. 1, to allow the visibility of the elements beneath) made with a polymeric material that is sufficiently elastic to allow the support-cover 39 to be fitted externally so as to cover the body 11, the insert 31, the housing of the battery 23 and the buttons 26 and 27. The elastic deformability of the support-cover 39 allows the actuation of the buttons 26 and 27; for access inside the battery housing 23 (for example to replace the battery), the cover 28 can be removed after having removed the support-cover 39. The insert 31 comprises a hole 40, formed on the face of the insert 31 facing towards the outside, for engagement with a corresponding protuberance 41 formed inside the support-cover 39, so as to ensure the correct positioning of the support-cover 39 itself. The hole 40 and the protuberance 41 can be seen better in the section of FIG. 3, where the electronic boards 21 and 22 are not shown, for the sake of clarity of drawing. The support-cover 39 also comprises two areas 46 and 47 at the buttons 26 and 27, displaying specific indications to visualize the presence of the buttons 26 and 27 and the possibility of actuating them by pressing on such areas 46 and 47 of the support-cover 39. The material of the support-cover 39, as well as being elastically deformable, is electrically insulating, i.e. it has resistivity greater than $10^7$ Ωm.

Instead of the buttons 26 and 27, it is possible to provide members of another type to act on the electronic buttons on the electronic board 21, for example levers or sliders.

In an embodiment (not shown in the drawings), the support-cover 39 can be provided with outer projections at the insert 31, so as to make it difficult incorrect gripping by the hands of the cyclist that can lead to having a part of the hand (which is substantially electrically conductive) right at the antenna 35.

Thanks to the teachings of the present disclosure, in the control device 10 possible transmission disturbances of the controls by the antenna 35 are avoided. The antenna 35 is indeed kept distanced from potentially conductive materials (like the material of the body 11 or the hands of the cyclist), thus preventing the generation of transmission disturbances. In particular, even if the material of the body is a carbon-fiber-based composite material, which is very conductive, it has been found that the antenna 35 transmits correctly, without disturbances. In relation to the possible interference of the hands of the cyclist, it is worth noting the positioning of the cavity 14, close to the face 34 of the body 11 intended for resting against the handlebar 1, and the positioning of the insert 31, on the inner side of the control 10; as a result of this, the insert 31 with the antenna 35 is in a position where the cyclist not only does not need to place his/her hands, but would actually find it difficult to put them there. This substantially rules out the possibility of the hands of the cyclist becoming a cause of possible transmission disturbances from the antenna 35.

The invention claimed is:

1. A radio-transmission bicycle control device, comprising:
   a body,
   at least one button on the body,
   an antenna for connection via radio to a component of the bicycle,
   an electronic unit on the body, connected to the at least one button and to the antenna, and
   an insert made of a material having resistivity greater than $10^7$ Ωm, wherein the insert is on the body and the antenna is on the insert.

2. The radio-transmission bicycle control device according to claim 1, wherein the body comprises a seat housing the insert, the seat and the insert being configured to distance the antenna in the insert of at least 5 mm from a material of the body.

3. The radio-transmission bicycle control device according to claim 2, wherein the body comprises a cavity housing the electronic unit, the seat being formed at the cavity.

4. The radio-transmission bicycle control device according to claim 2, wherein the seat is formed on an inner side of the body configured to face towards a middle of the bicycle when the control device is mounted on the bicycle.

5. The radio-transmission bicycle control device according to claim 2, wherein the seat is formed in the body close to a face of the body configured to rest against a handlebar of the bicycle.

6. The radio-transmission bicycle control device according to claim 1, further comprising a support cover fitted onto the body and onto the insert, the support cover being made of material having resistivity greater than $10^7$ Ωm.

7. The radio-transmission bicycle control device according to claim 6, wherein the support cover comprises an inner protuberance engaged in a hole in the insert.

8. The radio-transmission bicycle control device according to claim 6, wherein the support cover comprises outer projections at the insert.

9. The radio-transmission bicycle control device according to claim 1, wherein the body is made of a material having resistivity lower than $10^7$ Ωm.

10. The radio-transmission bicycle control device according to claim 9, wherein the body is made of a composite material comprising carbon fibers in a polymeric matrix.

11. The radio-transmission bicycle control device according to claim 1, wherein the insert is made of a polymeric material.

12. The radio-transmission bicycle control device according to claim 1, wherein the control device is a gearshift control device.

13. The radio-transmission bicycle control device according to claim 1, wherein the control device is an integrated control device, and wherein a brake lever is mounted on the body.

* * * * *